(12) United States Patent
Painter

(10) Patent No.: US 8,689,848 B2
(45) Date of Patent: Apr. 8, 2014

(54) BEAD LOCK ARRANGEMENT

(75) Inventor: Brian Painter, Dudley (GB)

(73) Assignee: Davian Enterprises, LLC, Greenback, TN (US)

( * ) Notice: Subject to any disclaimer, the term of this patent is extended or adjusted under 35 U.S.C. 154(b) by 921 days.

(21) Appl. No.: 11/597,481

(22) PCT Filed: Jun. 13, 2005

(86) PCT No.: PCT/GB2005/002325
§ 371 (c)(1),
(2), (4) Date: Aug. 28, 2007

(87) PCT Pub. No.: WO2005/123371
PCT Pub. Date: Dec. 29, 2005

(65) Prior Publication Data
US 2008/0202690 A1    Aug. 28, 2008

(30) Foreign Application Priority Data

Jun. 15, 2004 (GB) .................................. 0413275.9

(51) Int. Cl.
*B29D 30/24* (2006.01)
*B29D 30/26* (2006.01)

(52) U.S. Cl.
USPC ............................. 156/398; 156/415; 156/417

(58) Field of Classification Search
USPC .................. 156/131, 132, 398–403, 415, 417
See application file for complete search history.

(56) References Cited

U.S. PATENT DOCUMENTS

| 3,107,192 A | 10/1963 | McNenney |
| 3,580,782 A | 5/1971 | Leblond |
| 4,312,696 A * | 1/1982 | Bryant ........................... 156/415 |
| 4,325,764 A | 4/1982 | Appleby et al. |
| 4,683,021 A * | 7/1987 | Stalter et al. ................... 156/415 |

(Continued)

FOREIGN PATENT DOCUMENTS

| DE | 23 17 655 A1 | 10/1975 |
| DE | 24 41 237 A1 | 3/1976 |

(Continued)

OTHER PUBLICATIONS

Machine Translation of FR 2372693, patent document published Jun. 30, 1978.*

(Continued)

*Primary Examiner* — Geoffrey L Knable
(74) *Attorney, Agent, or Firm* — Pitts & Lake, P.C.

(57) ABSTRACT

This invention relates to a bead lock arrangement for use in tire building equipment, and to tire building equipment utilizing such a bead lock arrangement. A bead lock assembly is disclosed comprising first and second parallel, coaxial, axially spaced bead lock arrangements (13, 14), each bead lock arrangement including an annular, extensible, bead seating ring (38) encircling the radially movable segments (33) of the bead lock arrangement and having, at its radially outermost face, a circumferentially extending bead seating surface (39), and an annular sealing ring (42) positioned coaxial with the respective bead seating ring (38) and disposed adjacent a side face of the respective bead seating ring (38) presented generally towards the bead seating ring (38) of the opposing bead lock arrangement. The use of a bead seating ring (38) and a separately formed sealing ring (42) has considerable advantages over the use of a conventional bead seating ring. The use of a separate, extensible, bead seating ring (38) and a non-expanding sealing ring (42) allows the production of less complex items having extended service life.

5 Claims, 4 Drawing Sheets

(56) References Cited

U.S. PATENT DOCUMENTS

| | | | |
|---|---|---|---|
| 5,225,028 A * | 7/1993 | Bierens | 156/401 |
| 5,273,612 A | 12/1993 | Suetomi et al. | |
| 5,354,405 A | 10/1994 | Byerly | |
| 5,505,803 A | 4/1996 | Byerly | |
| 6,585,022 B1 * | 7/2003 | Rex | 156/401 |
| 6,640,863 B2 | 11/2003 | Terazono | |

FOREIGN PATENT DOCUMENTS

| | | |
|---|---|---|
| DE | 19934791 C1 * | 7/2000 |
| EP | 0654343 | 5/1995 |
| EP | 1 145 834 A | 10/2001 |
| FR | 2372693 A1 * | 6/1978 |
| GB | 0413275.9 | 6/2004 |
| WO | WO 2005/123371 A1 | 12/2005 |

OTHER PUBLICATIONS

PCT/GB2005/002325; International Search Report; mailed Sep. 5, 2005; 3 pp.

PCT/GB2005/002325; Written Opinion; mailed Sep. 5, 2005; 5 pp.

* cited by examiner

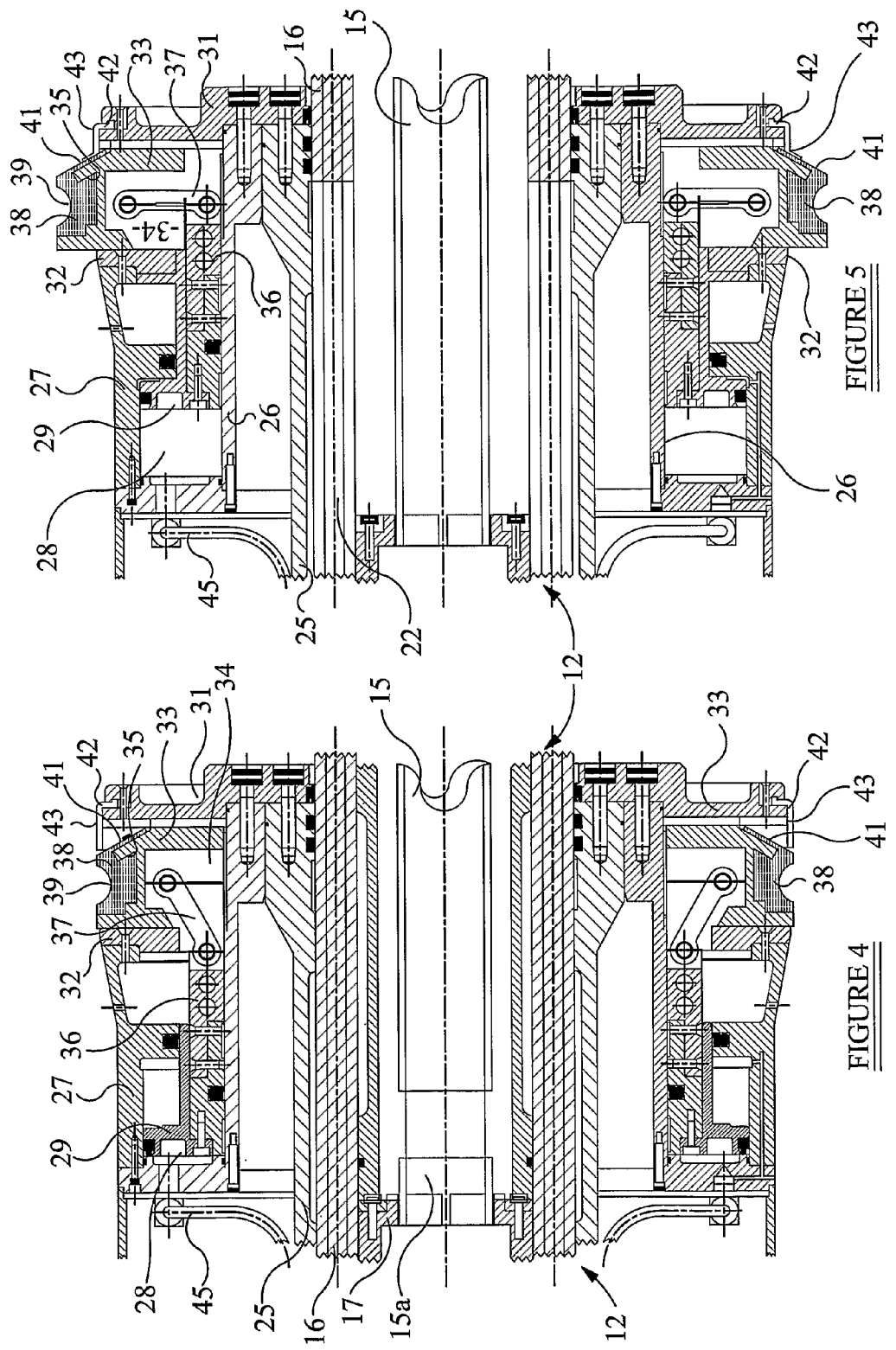

BEAD LOCK ARRANGEMENT

CROSS REFERENCE TO RELATED APPLICATION

This application is a 35 U.S.C. §371 of and claims priority to PCT International Application Number PCT/GB2005/002325 (Publication No. WO 2005/123371 A1), which was filed 13 Jun. 2005 (13 Jun. 2005), and was published in English, which was based on GB Patent Application No. 0413275.9 which was filed 15 Jun. 2004 (15 Jun. 2004) and the teachings of which are incorporated herein by reference.

This invention relates to a bead lock arrangement for use in tyre building equipment, and to tyre building equipment utilising such a bead lock arrangement.

Vehicle tyres include tyre beads which define the inner diameter of the tyre, and provide a pair of circular, parallel, coaxial, substantially inextensible edges whereby the tyre is seated, in use, on a wheel rim. Conventionally tyre beads are each defined by a substantially inextensible circular bead ring around which tyre carcass material is wrapped. Bead rings are conventionally formed from steel wire, but can be formed from textile filaments.

There are numerous different tyre building processes, but most share a common requirement to lock the tyre beads in a predetermined position relative to the remainder of the tyre carcass during formation of the tyre beads and the construction of the remainder of the carcass. This general principle will be well understood by those skilled in the art and a detailed disclosure of tyre building techniques is not necessary in this application in order for the skilled reader to reach an understanding of the invention.

It is known to provide a bead lock assembly in which a plurality of metal segments are movable radially outward from an axis of rotation to grip the bead of a preformed tyre carcass. It is also known, for example from European Patent 0654343 at an earlier stage in the building process to trap carcass material between the segments and the bead ring. It is to be understood that bead locks form parts of many different tyre building systems.

It is also known to provide bead lock assembly segments with an external extensible rubber band which forms the external surface of the bead lock assembly and provides a pneumatic seal at the beads of the tyre carcass during inflation of the carcass as part of the tyre building operation. The present invention seeks to provide a significant improvement over the known arrangements.

In accordance with the present invention there is provided a bead lock assembly for use in tyre building, the assembly including first and second parallel, coaxial, axially spaced bead lock arrangements, each bead lock arrangement including a plurality of bead lock segments movable radially relative to the longitudinal axis of the bead lock assembly between a collapsed, rest position and an expanded, operative position, each bead lock arrangement further including an annular, extensible, bead seating ring encircling the radially movable segments of the bead lock arrangement and having, at its radially outermost face, a circumferentially extending bead seating surface, and, each bead lock arrangement further including an annular seal positioned coaxial with the respective bead seating ring and disposed adjacent a side face of the respective bead seating ring presented generally towards the bead seating ring of the opposing bead lock arrangement, each annular seal engaging its respective bead seating ring at least in the operative position of the ring, to provide a pneumatic seal between the bead seating ring and a fixed component of the bead lock assembly.

Preferably each said annular seal includes an elongate cylindrical sleeve positioned with its longitudinal axis coextensive with the longitudinal axis of the bead lock assembly, the free end region of said sleeve engaging the respective bead seating ring when the ring is in its operative position, to provide said pneumatic seal therewith.

Desirably the side face of each bead seating ring is inclined, so that at least part of said side surface defines a frustum of a cone, the frusto-conical surface of the bead seating ring projecting into the associated annular seal so as to co-operate therewith during radial expansion of the bead seating ring towards its operative position.

Conveniently said sleeve of said annular seal is resilient.

Preferably each bead seating ring and its associated annular seal are formed from different materials, similar materials of different formulation, and/or materials of different hardness.

Preferably each segment of each bead lock arrangement is connected by a pivoting link to an axially displaceable piston, admission of fluid pressure, in use, to one face of the piston moving the piston axially to displace the segments, through the intermediary of said pivoted links, from the rest position to the operative position.

Preferably means is provided for applying fluid pressure to the opposite face of the piston to retract the piston and so retract the segments from their operative position to their rest position.

The invention further resides in tyre building apparatus incorporating a bead lock assembly as defined above.

One example of the invention is illustrated in the accompanying drawings wherein: —

FIGS. 4 and 5 are enlargements of one of the bead lock arrangements of FIGS. 1 and 2, FIG. 4 showing the bead lock arrangement in its rest position and FIG. 5 showing the bead lock arrangement in its operative position, and;

Figure 1:
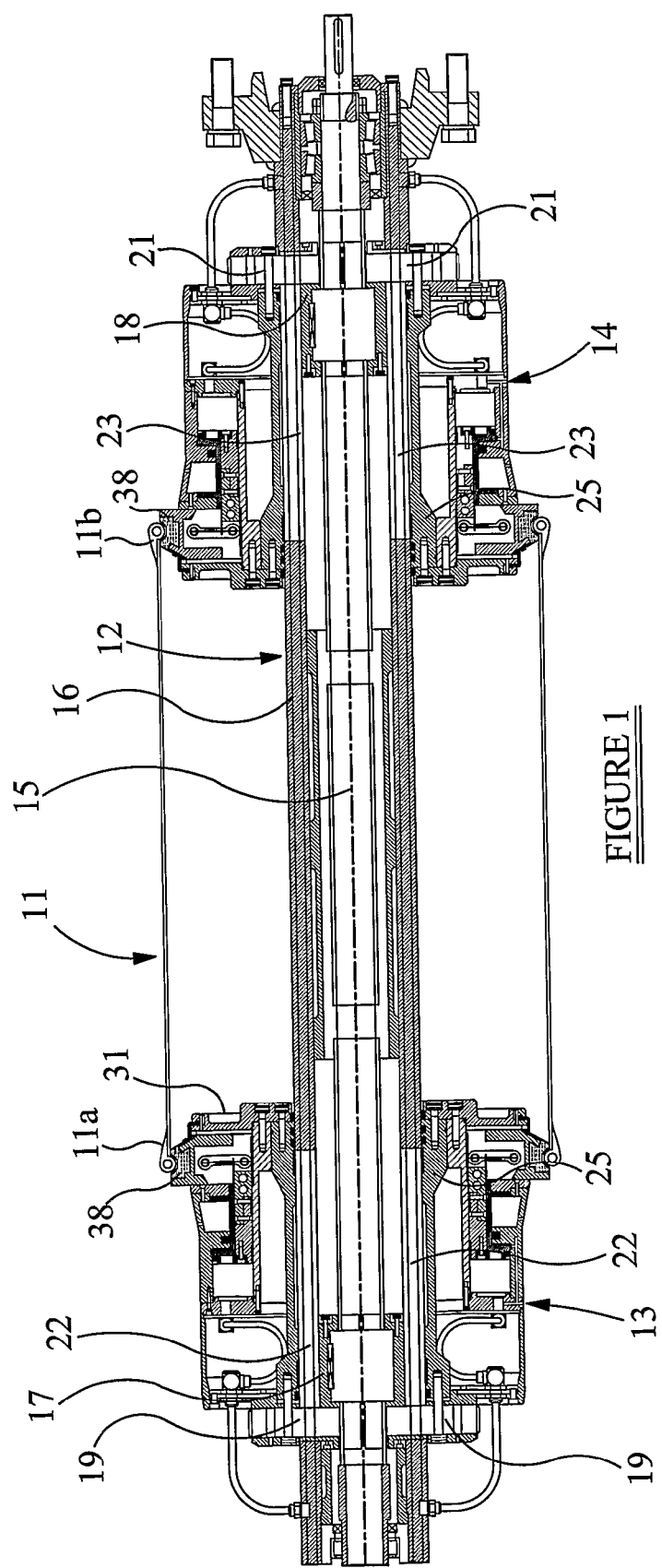
FIG. 1 is a diagrammatic, longitudinal sectional view of a bead lock drum for use in attaching a pre-formed first stage tyre carcass to a pre-formed belt and tread package, FIG. 1 being shown with the bead locks in their operative position.

The bead lock drum illustrated in the drawings is also sometimes referred to as a bead lock shaping drum and while it is convenient to describe the present invention in relation to a bead lock drum it is to be recognised that the inventive bead lock assembly can be utilised in many other forms of tyre building apparatus.

Referring to the drawings, the bead lock drum is intended to be used in amalgamating a pre-formed first stage tyre carcass 11 to a pre-formed belt and tread package (not shown). This method of tyre construction is well known and thus will be described only in sufficient detail necessary to achieve a full understanding of the inventive bead lock assembly, and inventive tyre building apparatus incorporating the assembly.

Figure 2:
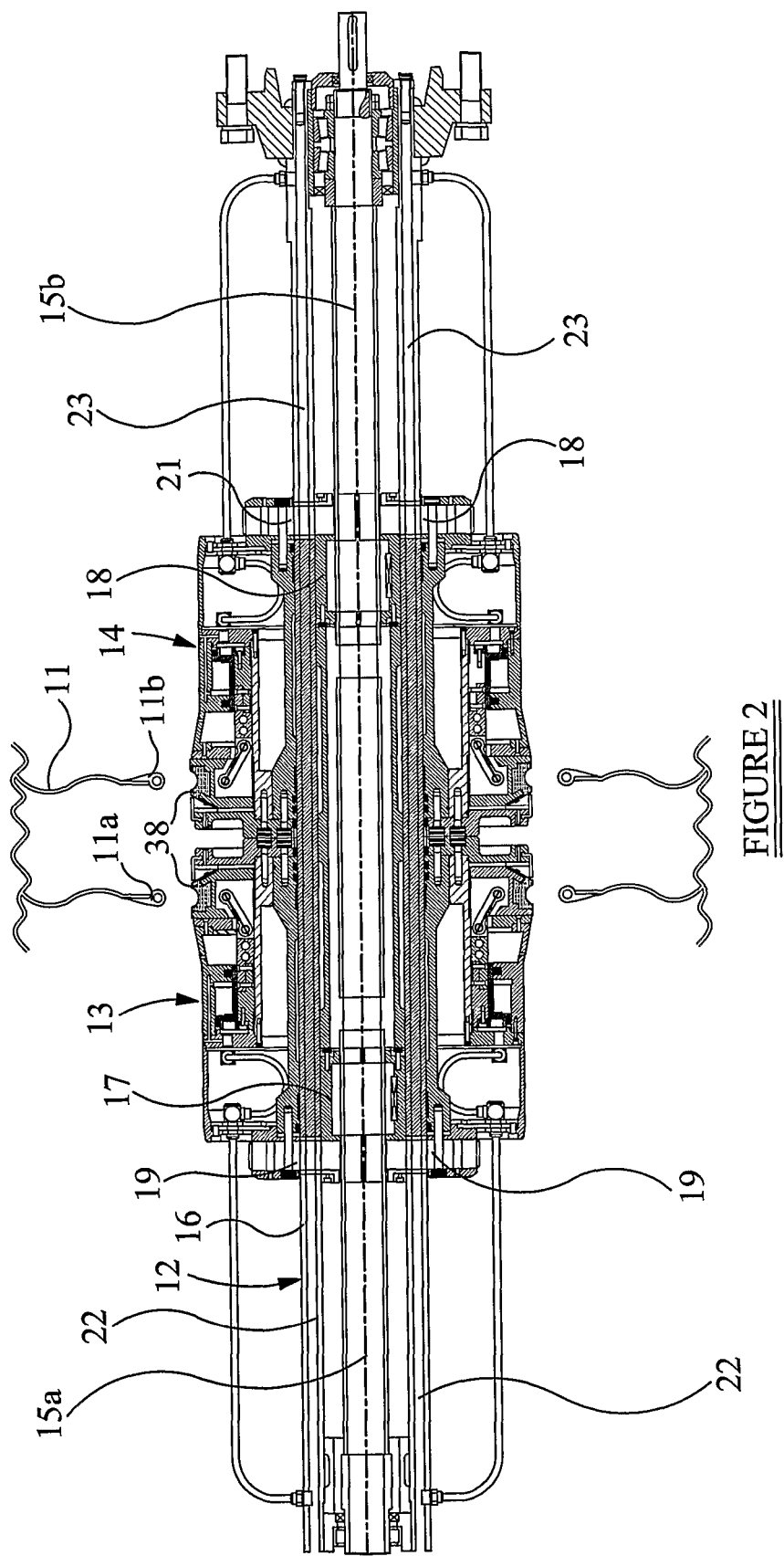
FIG. 2 is a view similar to FIG. 1 at a later stage in the assembly of the first stage carcass to the belt and tread package, showing the bead lock arrangements of the bead lock assembly, in their rest positions releasing a "green" tyre for further processing.

The bead lock drum includes first and second generally cylindrical bead lock units 13, 14 positioned coaxially on a common drive shaft assembly 12. The first and second units 13, 14 are substantially identical to one another in operation, and are mirror images of one another about a median plane normal to the longitudinal axis of the shaft assembly 12 and passing through the mid-point of the shaft assembly. Each unit 13, 14 is mounted for axial sliding movement on the shaft assembly 12 between a rest position as shown in FIG. 1 in which the units 13, 14 are at a maximum axial spacing from one another, and an operative position as shown in FIG. 2 in which the units have been moved along the length of the shaft assembly 12 almost into axial abutment.

The shaft assembly 12 includes a central screw shaft 15 and an outer, concentric, hollow shaft 16 upon which the units 13, 14 are slidable. Adjacent one end the shaft 15 has a region 15a carrying a left-hand screw thread and at its opposite end the shaft 15 has a similar screw threaded region 15b having a right-hand screw thread. In screw threaded engagement with each of the regions 15a, 15b, and housed within a clearance between the exterior of the shaft 15 and the interior of the shaft 16, is a respective nut 17, 18 held against rotation relative to the shaft 16 by respective diametrically opposed drive pins 19, 21 which are anchored at their inner most ends to the nuts 17, 18 respectively and protrude radially outwardly therefrom through axially extending slots 22, 23 in the shaft 16.

As mentioned above the units 13, 14 are mirror images of one another, and so throughout the remainder of this description like components in the units 13, 14 will carry the same reference numerals. Each of the units 13, 14 includes a support sleeve 25 mounted for sliding movement on the exterior of the shaft 16 and rigidly coupled to the respective drive pins 19, 21. Thus by virtue of its connection with the respective drive pins, each support sleeve can move axially, but not angularly, relative to the shaft 16, and the extent of axial movement of each support sleeve relative to the shaft 16 is determined by the length of the axial slots in the shaft 16 along which the respective drive pins 19, 21 can move.

Concentrically surrounding its support sleeve 25, and rigidly secured thereto in use, is a two-part cylinder housing comprising a cylindrical cylinder liner 26 and an outer member 27, the liner 26 and member 27 defining between them a respective annular pneumatic cylinder 28.

Slidably received within the cylinder 28 is an annular piston 29 having its longitudinal axis coextensive with the longitudinal axis of the shaft assembly 12. Each piston 29 is in sealing relationship with the wall of its respective cylinder 28.

At its end presented to the median plane of the drum each unit includes an end plate 31 in the form of an annular disc rigidly secured to the assembly of sleeve 25, liner 26, and outer member 27. The outer diameter of the end plate 31 is substantially equal to the outer diameter of the outer member 27 of the respective unit, but each outer member 27 terminates, in an axial direction, short of the respective plate 31 so that each unit has a parallel sided circumferentially extending channel one wall of which is defined by the plate 31, an opposite, parallel wall of which is defined by an annular bearing plate 32 secured to the respective housing outer member 27, and the base of which is defined by the respective cylinder line 26.

Received within the circumferential channel of each unit 14, 15 is a respective set of bead lock segments 33. Each set of bead lock segments 33 is formed from a cast and/or machined annulus which is then cut radially to separate the annulus into a plurality of identical segments. Each of the segments 33 is received slidably within the circumferential channel of its respective unit, the segments, as will be explained in more detail hereinafter, being held against movement along the circumferential length of the channel, but being capable of being moved radially within the channel from a rest position shown in FIG. 4, outwardly to an operative position shown in FIG. 5. Each segment 33 has parallel, opposite faces, in sliding engagement with the end plate 31 and the bearing plate 32 respectively, a hollow interior 34, and a re-entrant groove 35 in its radially outermost face.

The annular bearing plate 32 has an inner diameter significantly greater than the outer diameter of the cylinder liner 26 such that a sleeve like extension 36 of the piston 29 can, as the piston 29 is moved axially relative to the liner 26, protrude through the plate 32 into the circumferential channel. Pivotably secured to the forward end of the piston extension 36 is a plurality of rigid metal links 37 each of which is pivotably connected, at its end remote from the extension 36, to a respective segment 33, the links 37 extending through an apertured region of one wall of each segment 33 into the hollow interior 34 of the respective segment. It will be recognised therefore that displacement of the piston 29 axially towards the respective end plate 31 acts, through the intermediary of the links 37, to displace the segments 33 radially from a retracted, rest position shown in FIG. 4 to an expanded, operative position shown in FIG. 5. Similarly, withdrawal of the piston 29 retracts the segments 33 radially from the operative position back to their rest position. Each segment 33 may be coupled to one or more link 37 and the links 37 hold the segments 33 against circumferential movement in their respective channel.

Encircling the radially outermost face of the segments 33 is a single, annular, bead seating ring 38. The ring 38 is formed from a polyurethane material having a Shore hardness which can be categorised as between 60 and 75 Shore 'A'. The ring 38 is thus relatively hard, but is sufficiently resiliently extensible to permit the radial expansion of the segments 33 from their rest position to their operative position. It can be seen that the ring 38 has a generally "dove-tail" region received within the re-entrant region 35 of the groove in the radially outermost surface of the segments 33, and presents, radially outwardly, a predetermined, curved cross-section, bead seating groove 39. Moreover, the radially outermost edge region of each segment 33 presented to the respective end plate 31 is inclined to produce a frusto-conical surface, and the ring 38 has an integral frusto-conical region 41 overlying this surface of the segments 33.

Secured to the radially outermost edge of the plate 31 is a seal ring 42 including an integral, resiliently flexible, cylindrical sleeve 43 which extends axially away from the median plane of the drum and overlies the surface 41 of the bead seating ring 38.

As is apparent from FIGS. 4 and 5, in the retracted, rest position of the segments 33 the free edge of the sleeve 43 of the seal 42 is closely adjacent the surface 41 of the bead seating ring 38, but during expansion of the ring 38, as the segments 33 are moved radially, the surface 41 of the ring 38 engages the inner surface of the sleeve 43 and stretches the sleeve 43 outwardly so that a seal is formed between the rings 38 and 42.

The seal ring 42 is also formed from a polyurethane material, but is significantly more compliant and less hard than the polyurethane material of the ring 38, and conveniently the ring 42 is formed from a polyurethane material having an 'A' Shore hardness of 30 to 35.

Figure 3:
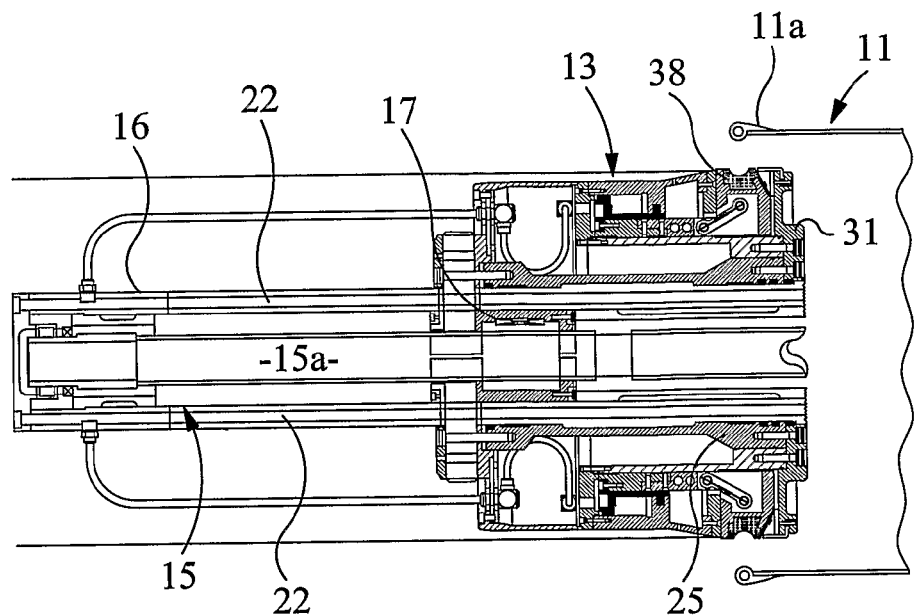
FIG. 3 is a view similar to FIG. 1, at an earlier stage than that shown in FIG. 1, in which the bead lock assemblies (only one shown in FIG. 3) are in their rest position.
Figures 6, 7:
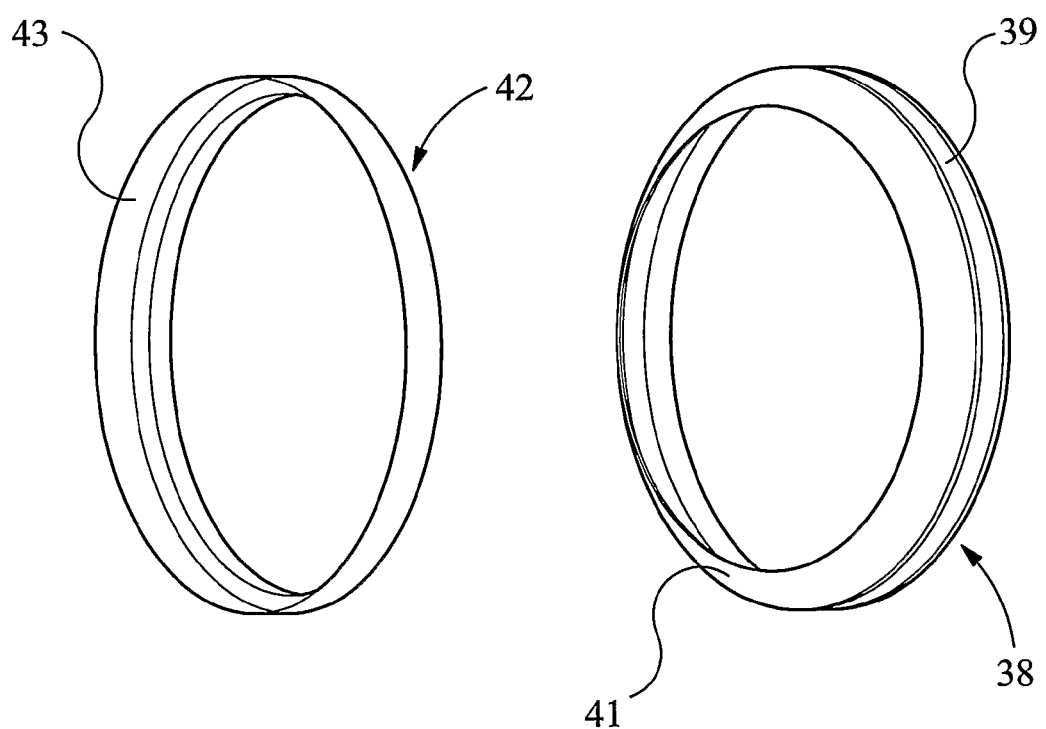
FIGS. 6 and 7 are diagrammatic perspective views respectively of an annular seal and an annular bead seating ring of the bead lock arrangements of FIGS. 1 to 5.

The operation of the drum is as follows. With the units 13, 14 displaced from one another as shown in FIG. 1, and the segments 33 and ring 38 in the rest position as shown in FIGS. 3 and 4, a first stage tyre carcass, which has been pre-formed, and is generally as shown in FIG. 1, is positioned in known manner coaxial with the drum. The first stage carcass 11 has the tyre beads 11a, 11b already formed, and the carcass 11 is positioned axially in relation to the drum such that the bead ring of the bead 11a overlies the bead seating ring 38 of the unit 13 while the bead ring of the bead 11b similarly overlies the ring 38 of the unit 14.

Next air under pressure is admitted through lines 45 of the units 13, 14 to the cylinders 28 to drive the pistons 29 forwardly towards the median plane of the drum. Such forward movement of the pistons 29 causes the piston extensions 36 to project into the circumferential channels of the units displacing the segments 33 radially outwardly to their operative position. The rings 38 stretch as the segments 33 are moved radially outwardly, and the profiled groove 39 in the radially outermost face of each ring 38 receives the respective bead 11a, 11b of the carcass 11. The radial outward movement of the segments 33 is such, in relation to the diameter of the bead rings of the tyre carcass beads 11a, 11b that the beads are seated firmly in the grooves 39 of the rings 38, the rubber outer layer of the beads 11a, 11b sealing against the profiled groove 39 of the respective ring 38. It will be recalled that as the segments 33 are displaced radially outwardly to their operative position the sleeve 43 of the seal ring 42 bears against the frusto-conical surface 41 of the seating ring 38 thereby sealing the interface of the plate 31 and the ring 38.

Air under pressure is now admitted to the void within the carcass 11 between the end plates 31 of the units 13, 14. Conveniently this air is admitted through the shaft 16 which has one or more radial drillings adjacent the median plane to allow air under pressure to enter the void within the carcass 11. At this stage the rings 38 tightly grip and seal against the beads 11a, 11b and each seal sleeve 43 seals against its respective frusto-conical surface 41. Thus admitting air under pressure into the void within the carcass 11a deforms the carcass 11a radially outwardly between the plates 31.

The next stage in the operation is to position a pre-formed, annular, belt and tread package coaxially over the mid-point of the length of the partially inflated carcass 11. The positioning of belt and tread packages on partially inflated first stage carcasses is not particular to the present invention and it will be recognised that transfer apparatus exists for this purpose.

As the belt and tread package is positioned over the partially inflated first stage carcass the shaft 15 is rotated relative to the shaft 16 so that rotation of the threads 15a, 15b relative to their respective nuts 17, 18 drives the nuts 17, 18 simultaneously towards the median plane of the drum, the drive pins 19, 21 sliding in the respective slots 22, 23 in the shaft 16. Thus the units 13, 14 are driven towards one another permitting further expansion of the carcass 11 under the influence of the raised air pressure within the carcass 11. The carcass 11 expands radially outwardly under the influence of internal air pressure until it engages the interior of the encircling belt and tread package, and thereafter a conventional forming process is performed to amalgamate the first stage carcass 11 and the associated belt and tread package. This process may involve rotation of the drum about the longitudinal axis of the shaft assembly 12.

Lastly, after formation of a "green" tyre (the name usually given to an assembled tyre prior to vulcanisation) the air pressure driving the pistons 29 forwardly to expand the segments 33 to their operative position is released, and air is admitted through lines 46 to the cylinders 28 at the opposite face of the pistons 29 to retract the pistons 29 back towards their rest positions thereby collapsing the segments 33 downwardly into the respective circumferential grooves of the units 13, 14 and releasing the rings 38 from the beads 11a, 11b of the "green" tyre. Thereafter the "green" tyre can be removed from the drum in known manner for vulcanisation, and if appropriate, further treatment, to produce a finished tyre. The shaft 15 is now rotated in the reverse direction relative to the shaft 16 to drive the units 13, 14 in the reverse direction away from one another to the rest positions which they occupy in FIG. 1.

The use of a bead seating ring 38 and a separately formed sealing ring 42 has considerable advantages over the use of a conventional bead seating ring. Conventionally it has been attempted to produce a bead seating ring and seal as a single component resulting in a compromise between the requirements of bead seating and sealing, and has necessitated the use of expensive, pressure moulded rings. The use of a separate, extensible bead seating ring and a non-expanding sealing ring allows the production of less complex items having extended service life. In particular, different formulations of polyurethane or rubber or similar materials, can be used for each component. The bead seating ring can be of a semi-rigid formulation and/or a formulation having a high shore hardness giving the advantage of improved bead location and control during carcass or component shaping, but owing to the provision of a relatively simple profile the ring can have sufficient elasticity, notwithstanding its hardness, to allow efficient functioning and high service life. Such an improvement can result in improvements in the efficiency and accuracy of tyre bead location during the manufacture of the tyre, giving rise to greater uniformity in tyre production. By comparison with the bead seating ring 38, the seal ring 42 can be of a relatively soft formulation, and/or a formulation of low shore hardness, giving improved sealing ability and extended service life noting of course that the seal ring is not required to expand in use, other than at the free end region of its sleeve portion 43.

The ability to utilise a semi-rigid and/or high shore hardness material for the bead seating ring allows the ring to be produced as a relatively simple moulding operation followed by a grinding operation to produce accurately the bead seating profile 39. It will be recognised that the ability to grind the final bead seating profile 39 in the ring 38 is a very significant advantage, since the grinding operation can be performed with the ring 38 expanded to its operative configuration. Thus the finished, operative profile of the bead seating groove 39 can accurately be achieved. Furthermore, a single moulded component can, by selectively grinding its bead seating profile, form the basis of a wide range of alternative bead seating rings for different tyre forms. An attendant advantage of this is that there is increased design flexibility during development of new tyre specifications without the need to provide additional tooling and associated costs in the manufacture of a specific bead seating ring.

The provision of a separately moulded and mounted bead seating ring allows the inclusion, in the material of the bead seating ring, of release agents or additives during moulding, without compromising the sealing function or service life of the seal aspects, it being understood that the sealing provision is afforded primarily by the ring 42. The separately moulded and mounted seal ring 42 can be clear of contact with the bead seating ring in the rest position of the bead seating ring 38 (as shown in FIG. 4) and the sealing ring 42, 43 is thus not subject to any pre-stretch or stress. Thus the sealing ring can achieve a consistent and superior shaping pressure sealing capability over an extended surface life by comparison with a composite seating and sealing ring of the prior art. The frusto-conical interface between the sleeve 43 and the surface 41, when the ring 38 is in its expanded, operative position, provides a dependable initial sealing between the plate 31 and the ring 38, and of course the application of air under pressure to the void within the carcass 11 in use loads the deformed region of the sleeve 43 against the frusto-conical surface 41 further enhancing the sealing between the plate 31 and the ring 38 (and therefore between the plate 31 and the carcass 11). Accordingly, higher initial shaping pressures can be utilised, and the higher the shaping pressure then the better will be the seal between the ring 42 and the ring 38.

An additional advantage of the accuracy with which a separate bead seating ring 38 can be formed, is that a controlled air gap can be provided between the inner face of the ring 38 and the base of the re-entrant groove 35 in each of the segments 33. An air gap in this region allows compliance between the bead seating ring 38 and the tyre beads to accommodate small variations in the profile and diameter of the tyre beads 11a, 11b which otherwise might displace the bead bodily with respect to the axis of the drum, leading to detrimental effects in the sealing achieved between the bead and the bead seating ring, and inaccuracies known as "bead runout" in the dimensional accuracy of the finished tyre.

It will be recognised that the bead lock assembly described above incorporating a respective bead lock arrangement in each of the units 13, 14, can be utilised in more complex tyre building drums, for example those which incorporate expanding and collapsing drum segments between the bead lock arrangements to support the tyre carcass during various stages in its manufacture, or during later stages in the manufacture of a tyre.

The invention claimed is:

1. A bead lock assembly for use in tyre building comprising first and second parallel, coaxial, axially spaced bead lock arrangements, each bead lock arrangement including a plurality of bead lock segments movable radially relative to a longitudinal axis of the bead lock assembly between a collapsed, rest position and an expanded, operative position, each bead lock arrangement further including an annular, extensible, bead seating ring encircling the radially movable segments of the bead lock arrangement and having, at its radially outermost face, a circumferentially extending bead seating surface having a predetermined curved cross section, and, each bead lock arrangement further including an annular seal positioned coaxial with the respective bead seating ring and disposed adjacent a side face of the respective bead seating ring presented generally towards the bead seating ring of the opposing bead arrangement, each annular seal engaging its respective bead seating ring at least in the operative position of the ring, to provide a pneumatic seal between the bead seating ring and a fixed component of the bead lock assembly, wherein the side face of each bead seating ring is inclined, so that at least part of said side face defines a frustum of a cone, the frusta-conical surface of the bead seating ring being spaced apart from the associated annular seal in the collapsed position and contacting the associated annular seal during radial expansion of the bead seating ring towards its operative position.

2. A bead lock assembly for use in tyre building comprising first and second parallel, coaxial, axially spaced bead lock arrangements, each bead lock arrangement including a plurality of bead lock segments movable radially relative to the longitudinal axis of the bead lock assembly between a collapsed, rest position and an expanded, operative position, each bead lock arrangement further including an annular, extensible, bead seating ring encircling the radially movable segments of the bead lock arrangement and having, at its radially outermost face, a circumferentially extending bead seating surface, and, each bead lock arrangement further including an annular seal positioned coaxial with the respective bead seating ring and disposed adjacent a side face of the respective bead seating ring presented generally towards the bead seating ring of the opposing bead arrangement, each annular seal engaging its respective bead seating ring at least in the operative position of the ring, to provide a pneumatic seal between the bead seating ring and a fixed component of the bead lock assembly; and wherein the bead seating ring is spaced from the annular seal when the bead lock segments are in the collapsed, rest position and the bead seating ring contacts the annular seal when the bead lock segments are in the expanded, operative position.

3. A bead lock assembly according to claim 2, wherein the bead seating surface of the bead seating ring has a predetermined curved cross section when the bead lock segments are in the collapsed, rest position and the expanded, operative position.

4. A bead lock assembly according to claim 2, wherein the bead seating ring has a Shore hardness between 60 and 75 Shore 'A'.

5. A bead lock assembly according to claim 2, wherein the bead seating ring has a hardness greater than a hardness of the annular seal.

* * * * *